United States Patent
Ozawa et al.

(10) Patent No.: US 7,256,983 B2
(45) Date of Patent: Aug. 14, 2007

(54) ELECTROLYTIC CAPACITOR

(75) Inventors: Masashi Ozawa, Tokyo (JP); Masayuki Takeda, Ibaraki (JP); Makoto Ue, Ibaraki (JP)

(73) Assignees: Nippon Chemi-Con Corporation, Tokyo (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/534,235

(22) PCT Filed: Nov. 7, 2003

(86) PCT No.: PCT/JP03/14216

§ 371 (c)(1),
(2), (4) Date: Nov. 28, 2005

(87) PCT Pub. No.: WO2004/042757

PCT Pub. Date: May 21, 2004

(65) Prior Publication Data

US 2006/0164791 A1    Jul. 27, 2006

(30) Foreign Application Priority Data

| Nov. 8, 2002 | (JP) | 2002-326010 |
| Nov. 8, 2002 | (JP) | 2002-326011 |
| Nov. 8, 2002 | (JP) | 2002-326019 |
| Nov. 8, 2002 | (JP) | 2002-326028 |

(51) Int. Cl.
  *H01G 9/10* (2006.01)
  *H05K 5/06* (2006.01)

(52) U.S. Cl. .................. 361/519; 361/518

(58) Field of Classification Search ......... 361/518–520
See application file for complete search history.

(56) References Cited

U.S. PATENT DOCUMENTS

| RE31,743 E | 11/1984 | Arora et al. |
| 6,219,224 B1 * | 4/2001 | Honda ..................... 361/537 |
| 6,262,879 B1 | 7/2001 | Nitta et al. |
| 2004/0095708 A1 | 5/2004 | Takeda et al. |

FOREIGN PATENT DOCUMENTS

| JP | 02249220 A | * 10/1990 |
| JP | 11067600 A |   3/1999 |
| JP | 11135365   |   5/1999 |
| JP | 2001102265 A |   4/2001 |
| JP | 2001326143 |  11/2001 |

* cited by examiner

*Primary Examiner*—Eric W. Thomas
(74) *Attorney, Agent, or Firm*—Young & Thompson

(57) ABSTRACT

An electrolytic capacitor having a low impedance characteristic, and a high withstand voltage characteristic in the 100V class, provides excellent high temperature life and leakage characteristics. An electrolyte solution containing an aluminum tetrafluoride salt is used. Moreover, a ceramics coating layer or an insulating synthetic resin layer is formed at a contact portion with a sealing component of a rivet or a cathode leading means. Alternatively, a partial cross-linking peroxide butyl rubber with added peroxide as a cross-linking agent to a butyl rubber polymer containing isobutylene, isoprene, and divinylbenzene copolymer is used as the sealing member. The electrolytic capacitor of the present invention has a low impedance characteristic, a high withstand voltage characteristic, and an excellent high temperature life characteristic.

10 Claims, 3 Drawing Sheets

ELECTROLYTIC CAPACITOR

FIELD OF THE INVENTION

The present invention relates to an electrolytic capacitor, especially, the electrolytic capacitor having a low impedance characteristic and a high withstand voltage characteristic.

BACKGROUND OF THE INVENTION

An electrolytic capacitor typically has such a structure shown in FIG. 1. That is, an anode electrode foil 2 is made of a band-shaped high purity aluminum foil where the effective aluminum foil surface has been enlarged through etching process chemically or electrochemically, and an oxide film is formed on the surface, through a chemical process of treating the aluminum foil with a chemical solution such as ammonium borate aqueous solution and the like. A cathode electrode foil 3 is also made of an etched aluminum foil of high purity. Capacitor element 1 is formed by the anode electrode foil 2 and the cathode electrode foil 3, wound together with intervening separator 11 made of manila paper and the like. Next, the capacitor element 1, after impregnating with electrolyte solution for driving the electrolytic capacitors, is housed into a bottomed outer case 10 made of aluminum and the like. The outer case 10 is equipped at the opening with a sealing member 9 made of an elastic rubber, and is sealed by drawing.

The anode electrode foil 2 and the cathode electrode foil 3 are each connected to lead wires 4 and 5, employed as electrode leading means to lead the electrodes, by means of stitching, ultrasonic welding, and the like, as shown in FIG. 2. Each of the lead wires 4 and 5 employed as electrode leading means is comprised of a rod member 6 made of aluminum, a connecting member 7 that comes into contact with each of the electrode foils 2 and 3, and an outside connecting member 8 made of solderable metal which has been fixed at the tip of the rod member 6.

Herewith, as electrolyte solution for driving the electrolytic capacitor having high conductivity, and to be impregnated to the capacitor element, wherein γ-butyrolactone is employed as the main solvent composed of quaternized cyclic amidin compounds (imidazolinium cation and imidazolium cation) as the cationic component and acid conjugated bases as the anionic component are dissolved therein as the solute (refer to Unexamined Published Japanese Patent Application No. H08-321449 and No. H08-321441)

However, due to the remarkable development of digital information devices in recent years, the high-speed driving frequency of micro-processor which is a heart of these electronic information devices is in progress. Accompanied by the increase in the power consumption of electronic components in the peripheral circuits, the ripple current is increased abnormally, and there is a strong demand for the electrolytic capacitors used in these circuits to have a low impedance characteristic.

Moreover, in the field of vehicles, with the recent tendency toward improved automobile functions, a low impedance characteristic is in high demand. By the way, the driving voltage of the vehicle circuit of 14V has been progressed to 42V accompanied by the increase in the power consumption. To comply with such a driving voltage, the electrolytic capacitor requires the withstand voltage characteristic of 28V and 84V and more. Furthermore, the electrolytic capacitors must withstand high temperature in this field, and a high temperature life characteristic is in demand.

However, the electrolytic capacitor cannot cope with the low impedance characteristic as such, Moreover, although the withstand voltage of 28V is capable, the limit is 30V, and it cannot respond to the requirement of the high withstand voltage of 84V and more. Moreover, these electrolytic capacitors suffer from a problem that the electrolyte solution would leak between the sealing member 12 and the perforation hole of the lead wire 5 for leading the cathode electrode. The electrolyte solution leakage invites the deterioration electronically such as decline in electrostatic capacity of the electrolytic capacitor resulting in the disadvantage of the short life of the electrolytic capacitors.

The problem with a small-sized electrolytic capacitor has been described so far. A similar problem does exist with a large-sized electrolytic capacitor. That is to say, in regard to the electrolytic capacitor shown in FIG. 3, it had a problem of leakage occurring from a contact portion with the rivet 15 and the sealing component 13 of the cathode electrode side.

Henceforth, the present invention aims to provide an electrolytic capacitor, having a low impedance characteristic and a high withstand voltage characteristic of 100V class, and excellent in high temperature life characteristic and leakage characteristic.

DISCLOSURE OF INVENTION

According to an electrolytic capacitor of the present invention, comprising a capacitor element fabricated by winding an anode electrode foil provided with anode leading means and a cathode electrode foil provided with cathode leading means via a separator is impregnated with electrolyte solution, an outer case for housing the capacitor element, and a sealing member for sealing an open part of the outer case, wherein the electrolyte solution in use contains an aluminum tetrafluoride salt, wherein the electrolytic capacitor has a ceramics coating layer at a contact portion with the sealing member of the cathode leading means.

BEST MODE TO CARRYING OUT THE INVENTION

Figure 1:
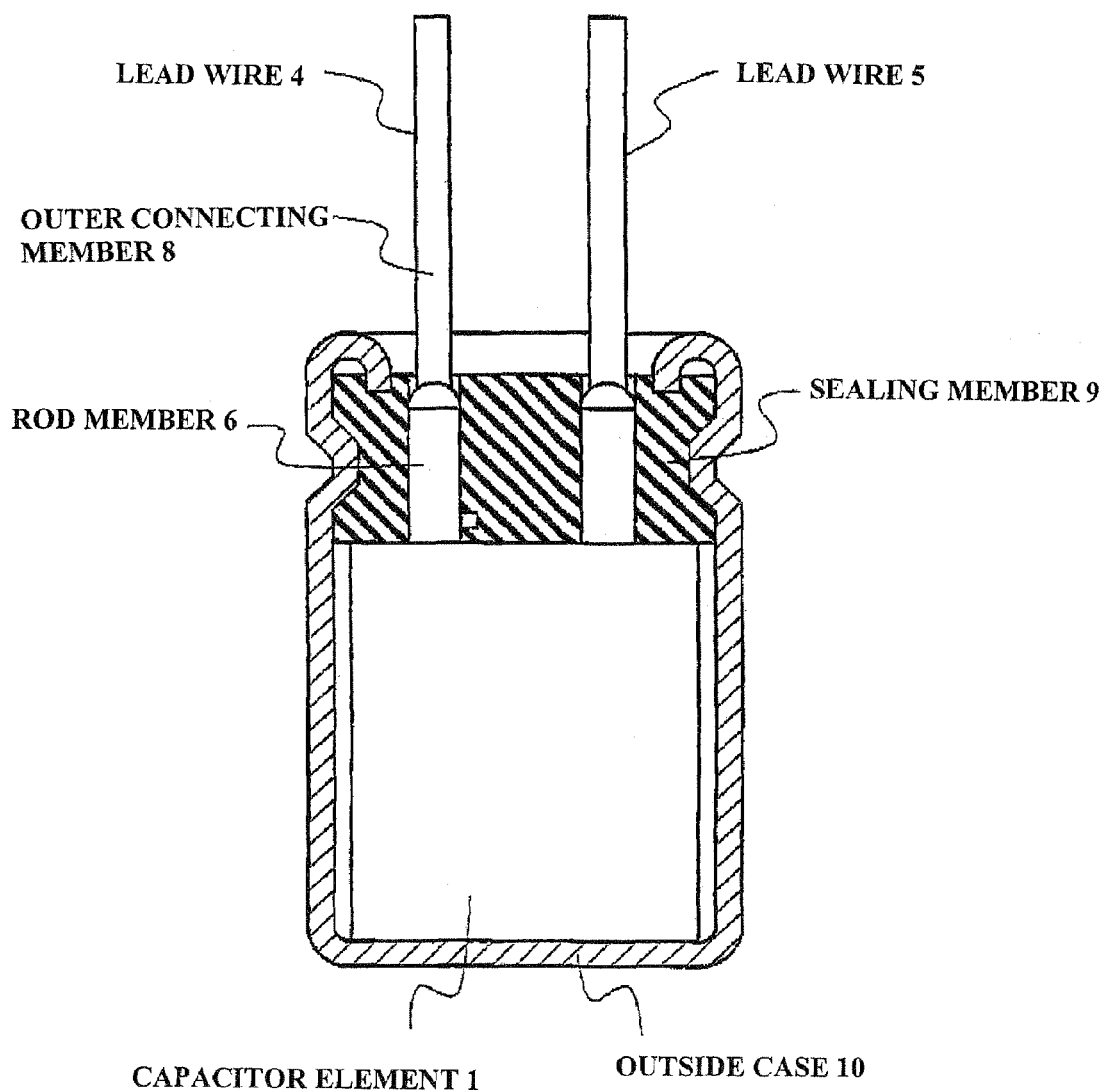
FIG. 1 is an inner cross-sectional view showing a structure of electrolytic capacitor.
Figure 2:
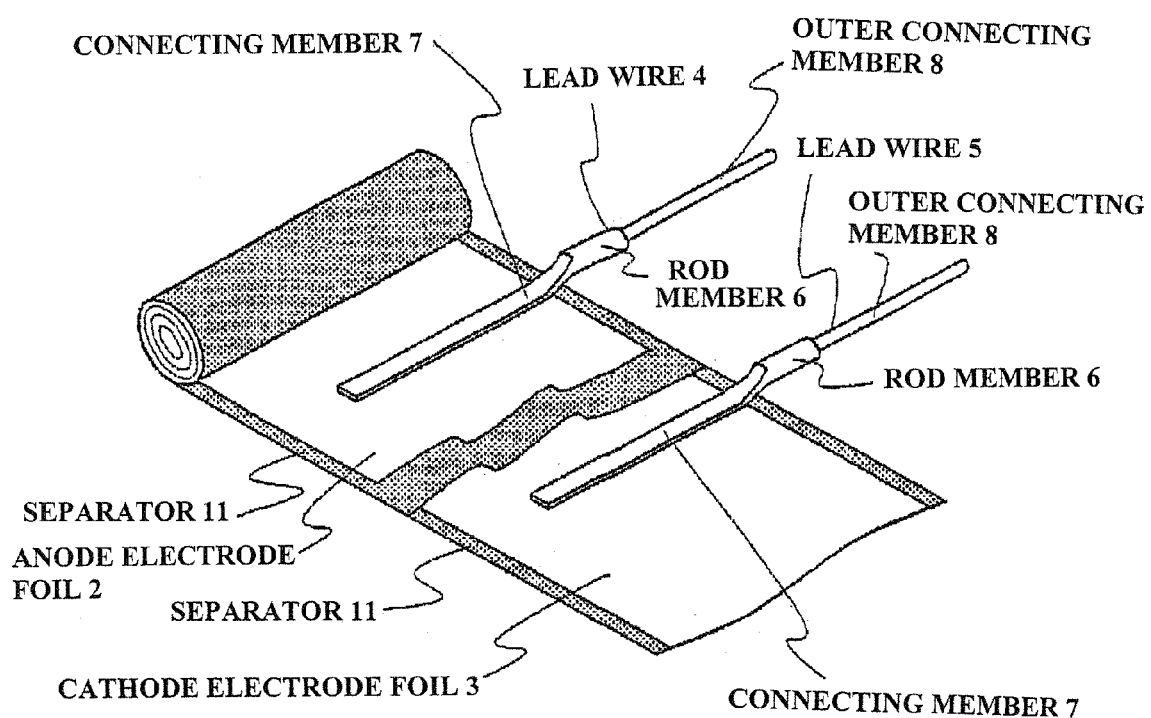
FIG. 2 is a decompositional oblique view showing a structure of electrolytic capacitor.

Aluminum electrolytic capacitor has such a structure same as the conventional structure, as shown in FIGS. 1 and 2. Capacitor element 1 is formed by an anode electrode foil 2 and a cathode electrode foil 3, wound together with intervening separator 11. Moreover, as shown in FIG. 2, lead wires 4 and 5, employed as the electrode leading means, are connected to the anode electrode foil 2 and the cathode electrode foil 3, respectively. The lead wires 4 and 5 are comprised of connecting members 7 that come into contact with both electrode foils; rod members 6 which are connected to the connecting members 7; and outer connecting members 8 weld to the rod members 6. Further, each foil and lead wire is mechanically connected by means of stitching, ultrasonic welding, and the like.

The anode electrode foil 2 used is one obtained in such a manner that an aluminum foil of a purity of 99% is subjected to chemical or electrochemical etching in an acidic solution to enhance the surface area thereof and then subjected to chemical treatment in an ammonium borate or ammonium adipate aqueous solution, so as to form an anode oxide film layer on the surface thereof.

The capacitor element 1 impregnating with the electrolyte solution is housed in an aluminum cylindrical outer case 10 with a bottom, and a sealing member 9, having a perforation hole for guiding the lead wires 4 and 5, is inserted into an open end of the outer case 10, and further, the open end of the outer case 10 is sealed by drawing to seal the electrolytic capacitor.

Further, in the present invention, a continuously pressed aluminum wire material is cut into a specified dimension to form an aluminum conductor comprised of rod member 6 and flat member 7, which is subjected to chemical treatment, and anode oxide film is formed on the surface. After that, an outer connecting member 8 made from CP wire is weld to the end face of the aluminum conductor, whereby the lead wires 4 and 5 are formed.

That is to say, on the rod member 6 of the aluminum conductor which forms the anode oxide film on the surface as per above, a coating agent composed of metal alcoxide ceramics is discharged, coated, and heated, which are repeated, followed by the formation of coating layer on the aluminum conductor.

Examples of ceramics of the metal alcoxide ceramics include $Al_2O_3$, $SiO_2$, $ZrO_2$, $TiO_2$, MgO, $H_2BO_3$, $Cr_2O_3$, $BaTiO_3$, $PbTiO_3$, $KTaO_3$, and the like. Further, the preferred ceramics are one kind or two kinds and more selected from $Al_2O_3$, $SiO_2$, and $ZrO_2$, as the ceramics to be used herein. Furthermore, taking the strength into consideration, the mixture made from $Al_2O_3$, and $SiO_2$ is preferable.

Moreover, a method of coating the rod member 6 by impregnating it with the coating agent is also available as the coating method. That is to say, this is the method of forming the coating layer on the aluminum conductor by impregnating the aluminum conductor with the coating agent, followed by thermal processing subsequent to impregnation to the coating agent repeatedly, followed by another thermal processing. After that, the flat member is impregnated with a methanol solvent, and then the coating layer is removed by means of ultrasonic waves and the like. The ceramic layer remains only on the rod member 6. However, adjustment of the coating removal cannot be facilitated in this method. The discharging and coating method is ideal for accurately forming the coating layer on the rod member The flat member 7 of the lead wires 4 and 5 formed accordingly are mechanically connected to the electrode foils 2 and 3 by means of stitching, ultrasonic welding, and the like. There is also another method available that employs the ceramic coating after connecting the lead wire 5 to the cathode electrode foil 3. However, taking the coating precision into consideration, the coating layer is preferably formed before the capacitor production process. Furthermore, the ceramic coating layer should be formed at least on the rod member 6 of the lead wire 5, in order to obtain a sufficient leakage prevention effect.

The electrolyte solution of the electrolytic capacitor used in the present invention contains an aluminum tetrafluoride salt.

As the aluminum tetrafluoride salt constituting the aluminum tetrafluoride as anion component, examples of this salt include an ammonium salt, an amine salt, a quaternary ammonium salt, or a quaternary cyclic amidinium ion as cation component, can be used. Examples of an amine constituting the amine salt include a primary amine (such as methylamine, ethylamine, propylamine, butylamine, ethyl-enediamiune, monoethanolamine, and the like); secondary amine (such as dimethylamine, diethylamine, dipropylamine, ethy-methylamine, diphenylamine, diethanolamine and the like); and tertiary amine (such as trimethylamine, triethylamine, tributylamine, triethanolamine, and the like). Examples of a quaternary ammonium constituting the quaternary ammonium salt include a tetraalkylammonium (such as tetramethylammonium, tetraethylammonium, tetrapropylammonium, tetrabutylammonium, methyltriethylammonium, di-methyldiethylammonium and the like) and a pyridinium (such as 1-methylpyridinium, 1-ethylpyridinium, 1,3-diethylpyridinium and the like).

Furthermore, as for salt containing the quaternized cyclic amidinium ion as a cationic component, the quaternized cyclic amidinium ion is a cation formed by quaternized a cyclic compound having an N,N,N'-substituted amidine group, and the following compounds are exemplified as the cyclic compound having an N,N,N'-substituted amidine group. They are an imidazole monocyclic compound (for example, an imidazole homologue, such as 1-methylimidazole, 1-phenylimidazole, 1,2-dimethyl-imidazole, 1-ethyl-2-methylimidazole, 2-ethyl-1-methylimidazole, 1,2-diethylimidazole, 1,2,4-trimethylimidazole and the like, an oxyalkyl derivative, such as 1-methyl-2-oxymethylimidazole, 1-methyl-2-oxyethyl-imidazole, and the like, a nitro derivative such as 1-methyl-4(5)-nitroimidazole, and the like, and an amino derivative such as 1,2-dimethyl-5(4)-aminoimidazole, and the like), a benzoimidazole compound (such as 1-methylbenzoimidazole, 1-methyl-2-benzylbenzoimidazole, 1-methyl-5(6)-nitrobenzo-imidazole and the like), a compound having a 2-imidazoline ring (such as 1-methylimidazoline, 1,2-dimethylimidazoline, 1,2,4-trimethylitaidazoline, 1-methyl-2-phenylimidazoline, 1-ethyl-2-methylimidazoline, 1,4-dimethyl-2-ethyl-imidazoline, 1-methyl-2-ethoxymethylimidazoline, and the like), a compound having a tetrahydropyrimidine ring (such as 1-methyl-1,4,5,6-tetrahydropyrimidine, 1,2-dimethyl-1,4,5,6-tetrahydropyrirnidine, 1,8-diazabicyclo[5,4,0] undecen-7,1,5-diazabicyclo[4,3,0]-nonene-5, and the like), and the like.

The solvent in use for electrolyte solution according to the present invention comprises a polar protic solvent, a polar aprotic solvent, and their mixture thereof. Examples of the polar protic solvent include monohydric alcohols (such as ethanol, propanol, butanol, pentanol, hexanol, cyclo-butanol, cyclo-pentanol, cyclo-hexanol, benzyl alcohol, and the like); and polyhydric alcohol and oxy alcohol compounds (such as ethylene glycol, propylene glycol, glycerine, methyl cellosolve, ethyle cellosolve, methoxy propylene glycol, dimethoxy propanol, and the like). Moreover, representative examples of the aprotic polar solvent include amide series (such as N-methylformamide, N,N-dimethylformamide, N-ethylformamide, N,N-diethylformamide, N-methyl acetamide, N,N-dimethyl acetamide, N-ethyl acetamide, N,N-diethyl acetamide, hexamethylphosphoric amide, and the like); lactone compounds (such as γ-butyrolactone, δ-valerolactone, γ-valerolactone, and the like); sulfolane series (such as sulfolane, 3-methyl sulfolane, 2,4-dimethyl sulfolane, and the like); cyclic amide compounds (such as N-methyl-2-pyrrolidone, and the like); carbonate compounds (such as ethylene carbonate, propylene carbonate, isobutylene carbonate, and the like); nitrile compound (such as acetonitrile, and the like); sulfoxide compound (such as dimethyl sulfoxide, and the like); 2-imidazolidinone solvents [for example, 1,3-dialkyl-2-imidazoridinone (such as 1,3-dimethyl-2-imidazoridinone, 1,3-diethyl-2-imidazoridinone, 1,3-di(n-propyl)-2-imidazoridinone, and the like); and 1,3,4-trialkyl-2-imidazoridinone (such as 1,3,4-trimethyl-2-imidazoridinone, and the like)], and the like.

Among them, γ-butyrolactone is preferably used because the impedance characteristic improves. Sulfolane, 3-methyl sulfolane, and 2,4-dimethyl sulfolane are preferably used because the high temperature characteristic improves. Ethylene glycol is preferably used because the withstand voltage characteristic improves.

Herewith, in the electrolyte solution containing quaternized cyclic amidinium salts as the solute, and employing γ-butyrolactone as the solvent, although the electrolytic capacitors suffer from a problem of electrolyte solution leakage from between the sealing member 9 and the rod member 6 of the lead wire during the life test. In contrast thereto, no liquid leakage is observed in the electrolytic capacitor of the present invention. Namely, in a normal electrolytic capacitor, the spontaneous immersion potential of the cathode lead wire 5 is noble as compared with the spontaneous immersion potential of the cathode electrode foil 3. When a direct current is loaded, therefore, more cathode current passes through the cathode lead wire than through the cathode electrode foil. Moreover, when left standing unloaded, a local cell is formed by the cathode lead wire and the cathode electrode foil and thus a cathode current passes through the cathode lead wire. That is to say, a cathode current passes through the cathode lead wire both in the loaded and unloaded states. As a result, hydroxyl ion is formed at electrolyte solution interface between the rod member 6 and the connecting member 7 of the cathode lead wire.

Then, the hydroxyl ion thus formed reacts with a quaternized cyclic amidinium. The quaternized cyclic amidinium undergoes ring-opening to give a secondary amine. When hydroxyl ion is formed, however, γ-butyrolactone employed as the solvent also reacts with hydroxyl ion to give γ-hydroxybutyric acid, and the pH is lowered. Due to a decline in the pH value, the secondary amine formed by the ring-opening of the quaternized cyclic amidinium undergoes ring-closure to give the quaternized cyclic amidinium salt again. Since the quaternized cyclic amidinium salt thus formed is not volatile but highly hygroscopic, there arises liquid leakage due to the hygroscopicity of the quaternized cyclic amidinium salt regenerated between the rod member and the sealing member of cathode lead wire.

However, in the present invention, at a contact portion with the sealing member of the cathode leading means, a ceramics coating layer is formed, and as a solute the aluminum tetrafluoride salt of the quaternized cyclic amidinium compound is used. For this reason, the cathode current flows to the cathode electrode foil. Most of the hydroxyl ions are generated in the cathode electrode foil. Further, when aluminum of high purity is used in the cathode tab, a difference in the potentials of the cathode electrode foil and the cathode tab gets large, and the hydroxyl ion generation at the cathode tab gets less. Furthermore, the aluminum tetrafluoride salt of the quaternized cyclic amidinium compound seems to show a less reactivity with the hydroxyl ion, These synergistic effects prevent the leakage. The leakage is similarly prevented in the unloaded state.

Subsequently, the second electrolytic capacitor of the present invention will be explained. An electrolytic capacitor of the present invention is comprising a capacitor element fabricated by winding an anode electrode foil provided with anode leading means and a cathode electrode foil provided with cathode leading means via a separator is impregnated with electrolyte solution, an outer case for housing the capacitor element, and a sealing member for sealing an open part of the outer case, wherein the electrolyte solution in use contains an aluminum tetrafluoride salt, is forming an insulating synthetic resin layer at a contact portion with the sealing member of the cathode leading means.

The electrolytic capacitor has the same structure as the first electrolytic capacitor, however, the present invention employs the coating of aluminum conductor as the cathode leading means, by forming the insulating synthetic resin layer.

Examples of insulating synthetic resin material include thermosetting resin such as epoxy resin, phenol resin, furan resin, melamine resin, xylene resin, guanamine resin, and the like; and thermoplastic resin such as fluorocarbon resin, polybutadiene, polyamido, polyamido-imido, polyarylate, polyphenylenesulphide polyimido, polyether imide, polyetheretherketone, polycarbnate, poly vinyl formal, liquid crystal polymer, ketone resin, coumarone resin, MBS resin, and the like. These materials may be used in combination with coupling agent such as silane, titanate, and the like.

That is to say, the insulating synthetic resin layer is formed on the aluminum conductor by discharging and coating a coating agent to the rod member 6 of the aluminum conductor followed by the drying process to form the anode oxide film on the surface. The coating agent is comprised of insulating synthetic material melt adjusted by appropriate solvent or by heating, without employing the coupling agent, or after forming the coupling agent by coating and drying the coupling agent.

Alternatively, a molded synthetic resin film, having a thermal melting property, is employed as the rod member 6, followed by its thermal processing.

Moreover, a method of coating the rod member 6 by impregnating with the coating agent is also available as the coating method. That is to say, this is a method of forming the coating layer on aluminum conductor by impregnating the aluminum conductor with the coating agent. After that, the flat member 7 is impregnated with a methanol solvent, and then the coating layer is removed by means of ultrasonic waves and the like. The ceramics layer remains only on the rod member 6. However, adjustment of the coating removal cannot be facilitated in this method. The discharging and coating method is ideal for accurately forming the coating layer on the rod member.

Herewith, a behavior of the electrolyte solution leakage is similar to the first electrolytic capacitor, however, in the present invention, an insulating synthetic resin layer is formed on a contact portion with the sealing member of the cathode leading means, and as solute, the aluminum tetrafluoride salt of quaternary cyclic amidinum compound is utilized. Thus, the current passing through the cathode leading means is controlled, and the generation of hydroxyl ion near the cathode leading means is reduced. Then, the reactivity of aluminum tetrafluoride salt of the quaternary cyclic amidinum compound with the hydroxyl ion is seemingly less. Thus, these synergistic effects prevent the liquid leakage. The leakage is similarly prevented in the unloaded state.

Subsequently, the third electrolytic capacitor of the present invention will be described. According to the electrolytic capacitor of the present invention comprises the capacitor element fabricated by winding an anode electrode foil and a cathode electrode foil via a separator is impregnated with the electrolyte solution, an outer case for housing the capacity element, and wherein the electrolyte solution in use contains an aluminum tetrafluoride salt, and as sealing member, a partial cross-linking peroxide butyl rubber that added peroxide as cross-linking agent to a butyl rubber polymer comprised of isobutylene, isoprene, and divinylbenzene copolymer is used.

Structure of this electrolytic capacitor is same as the first electrolytic capacitor of the present invention. However, in the present invention, a partial cross-linking peroxide butyl rubber that added peroxide as cross-linking agent to a butyl rubber polymer comprised of isobutylene, isoprene, and divinylbenzene copolymer is used as the sealing member. Examples of vulcanizing agents used in the vulcanization of peroxides include ketone peroxides, peroxy ketals, hydroperoxides, dialkyl peroxides, diacyl peroxides, peroxy dicarbonates, peroxy esters, and the like. Specific examples are 1,1-bis-t-butylperoxy-3,3,5-trimethylcyclohexane, n-butyl-4,4-bis-t-butylperoxy-valerate, dicumyl peroxide, t-butyl-peroxy-benzoate, di-t-butyl-peroxide, benzoyl peroxide, 1,3-bis (t-butyl peroxy-isopropyl) benzene, 2,5-dimethyl-2,5-di-t-butylperoxyl-hexene-3, t-butyl peroxy cumene, α, α'bis (t-butylperoxy) diisopropylbenzene, and the like.

According to the electrolytic capacitor of the present invention, a partial cross-linking peroxide butyl rubber that added peroxide as cross-linking agent to a butyl rubber polymer comprised of isobutylene, isoprene, and divinylbenzene copolymer is used as the sealing member. The electrolyte solution containing the aluminum tetrafluoride salt is used. The electrolytic capacitor of the present invention has a low impedance characteristic, and a high withstand voltage characteristic of 100V class. The high temperature life characteristic is improved further by the excellent high temperature characteristics of the electrolyte solution and the sealing member of the present invention.

Moreover, the quaternary cyclic amidinium compound tends to cause leakage due to the reaction with the hydroxyl ion generated in the vicinity of the cathode leading means, however, the electrolyte solution used in the present invention seemingly has a less reactivity with the hydroxyl ion, and owing to the excellent sealability between the perforation hole of the sealing member and the lead wire, the leakage characteristic is further improved by these synergistic effects.

The large-sized, fourth electrolytic capacitor will be described subsequent to the small-sized electrolytic capacitor that has been described so far.

An electrolytic capacitor of the present invention is comprising a capacitor element fabricated by winding an anode electrode foil provided with anode leading means and a cathode electrode foil provided with cathode leading means via a separator is impregnated with electrolyte solution, a cylindrical outer case with a bottom for housing the capacitor element, and a rivet for connecting the cathode leading terminal and an outside terminal by sealing with a sealing component, is forming a ceramics coating layer at a contact portion with the sealing member of the cathode leading means.

An electrolytic capacitor of the present invention is comprising a capacitor element fabricated by winding an anode electrode foil provided with anode leading means and a cathode electrode foil provided with cathode leading means via a separator is impregnated with electrolyte solution, a cylindrical outer case with a bottom for housing the capacitor element, and a rivet for connecting the cathode leading terminal and an outside terminal by sealing with a sealing component, is forming a ceramics coating layer at the cathode leading terminal.

Figure 3:
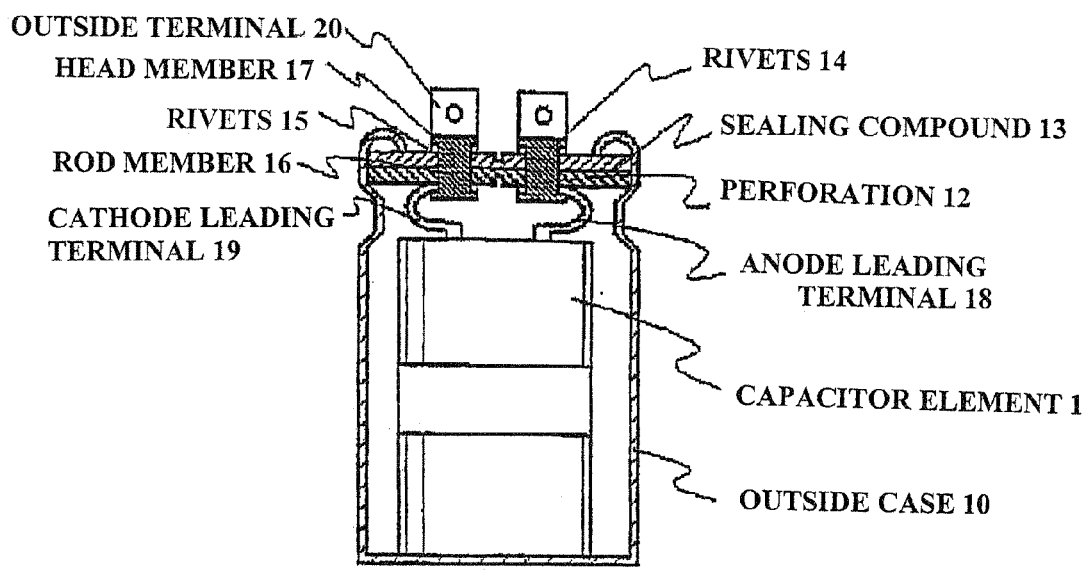
FIG. 3 is an inner cross-sectional view showing a structure of the large-sized electrolytic capacitor.

According to the aluminum electrolytic capacitor structure, as shown in FIG. 3, a capacitor element 1 is formed by an anode electrode foil and a cathode electrode foil, wound together with intervening separator. Moreover, the anode and cathode electrode foils are respectively connected to the anode leading terminal 18 and the cathode leading terminal 19.

The anode electrode foil used is one obtained in such a manner that an aluminum foil of a purity of 99% is subjected to chemical or electrochemical etching in an acidic solution to enhance the surface area thereof and then subjected to chemical treatment in an ammonium borate or ammonium adipate aqueous solution, so as to form an anode oxide film layer on the surface thereof.

Moreover, the cathode electrode foil used is an aluminum foil of a purity of 99% having been subjected to etching. Herewith, in the likewise manner as the anode electrode foil, the chemical treatment of 1 to 2 V may be performed.

The aluminum foil of 99% purity and more is used as the anode leading terminal 18 and the cathode leading terminal 19.

Then, the rivets 14 and 15 made of aluminum are buried near the central area of the sealing component 13 that is formed by joining the elastic material, such as rubber board, and the hard insulating board, such as phenol resin laminated board. These rivets 14 and 15 have the rod members 6 and the head members 17.

In the present invention, the rivet 15 of the cathode electrode side is coated by the ceramics coating layer. In other words, the coating layer is formed on the rod member 16 of the rivet 15 by discharging and coating with the coating agent made of metal alcoxide ceramics, followed by drying the aluminum conductor. Herewith, taking the leakage prevention effect into consideration, the coating layer should at least be formed on the rod member 16 of the rivet 15. Moreover, preferably, the rivet may be subjected to chemical treatment prior to coating, and the anode oxidation film is formed on its surface.

The ceramics coating material and the coating method adopted here are the same as the first electrolytic capacitor.

The rivets 14 and 15 formed accordingly are buried near the central area of the sealing component 13 that is formed by joining the elastic material, such as rubber board, and the hard insulating board, such as phenol resin laminated board. Then, the outside terminals 20 are prepared on the head members 17 of the rivets 14 and 15, the end parts of the rivets 14 and 15 are sealed by drawing, and the outside terminals 20 are fixed into position.

The cathode leading terminal 19 may be similarly coated replacing the cathode electrode side rivet 15.

Then, the capacitor element 1 formed accordingly is impregnated with the electrolyte solution for driving electrolytic capacitor. The electrolyte solution in use is the same as the first electrolytic capacitor.

The electrode leading terminal of the capacitor element 1 impregnated with the electrolyte solution as per above is connected to lower ends of the rivets 14 and 15. The capacitor element 1 is housed into a cylindrical outer case 10 with a bottom, made from aluminum. Then, the sealing component 13 is inserted to the open end of the outer case 10. Further, the end part of the outer case 10 of the electrolytic capacitor is sealed by drawing and bending.

According to the large-sized electrolytic capacitor as such, an electrochemical relationship exists between a cathode electrode foil and a cathode lead wire 5 described previously regarding the small-sized electrolytic capacitor likewise exists between the cathode electrode side rivet 15 or the cathode electrode leading terminal 19 and the cathode electrode foil. The leakage might be occurring. To comply with this, in the present invention, the ceramics coating layer is formed on the cathode electrode side rivet 15 or the cathode leading terminal 19, so that the current does not pass through the cathode electrode lead terminal 19 or the cathode electrode side rivet 15 both in the loaded and unloaded states, and the leakage is thought to be prevented.

According to the electrolytic capacitor of the present invention, it has the low impedance characteristic and the high withstand voltage characteristic of 100V class, and the excellent leakage characteristic. Moreover, the high temperature life characteristic is also excellent.

Subsequently, the large-sized, fifth electrolytic capacitor will be described.

An electrolytic capacitor of the present invention is comprising a capacitor element fabricated by winding an anode electrode foil provided with anode leading means and a cathode electrode foil provided with cathode leading means via a separator is impregnated with electrolyte solution, a cylindrical outer case with a bottom for housing the capacitor element, and a rivet for connecting the cathode leading terminal and an outer terminal by sealing with a sealing component, is forming an insulating synthetic resin layer at a contact portion with the sealing component of the rivet.

An electrolytic capacitor of the present invention is comprising a capacitor element fabricated by winding an anode electrode foil provided with anode leading means and a cathode electrode foil provided with cathode leading means via a separator is impregnated with electrolyte solution, a cylindrical outer case with a bottom for housing the capacitor element, and a rivet for connecting the cathode leading terminal and an outer terminal by sealing with a sealing component, is forming a ceramics coating layer at the cathode leading terminal.

Structure of this electrolytic capacitor is similar to the fourth electrolytic capacitor. However, in the present invention, the cathode electrode side rivet 15 of the cathode electrode side is coated by the insulating synthetic resin layer. In other words, the coating layer is formed on the rod member 16 of the rivet 15 by discharging and coating with the coating agent made of metal alcoxide ceramics, followed by drying of the aluminum conductor Herewith, taking the leakage prevention effect into consideration, the coating layer should at least be formed on the rod member 16 of the rivet 15. Moreover, preferably, the rivet may be subjected to chemical treatment prior to coating, and the anode oxidation film is formed on its surface.

The ceramics coating material and the coating method adopted here are the same as the first electrolytic capacitor.

Herewith, a behavior of the electrolyte solution leakage is similar to the first electrolytic capacitor, however, in the present invention, an insulating synthetic resin layer is formed on the cathode electrode leading terminal 19 or the cathode electrode side rivet 15, and so that the current does not pass through the cathode electrode lead terminal 19 or the cathode electrode side rivet 15 both in the loaded and unloaded states, and the leakage is thought to be prevented.

According to an electrolytic capacitor of the present invention, having a low impedance characteristic, and a high withstand voltage characteristic of 100V class, wherein the electrolytic capacitor provides an excellent high temperature life characteristic and an excellent leakage characteristic.

Furthermore, the first to fifth electrolytic capacitors of the present invention will be described. The electrode foil subjected to phosphate treatment is used as the electrode foils. The present invention is still effective by using the electrode foil subjected to phosphate treatment as one of the cathode electrode foil and the anode electrode foil. Deterioration of both foils is prevented if this is applied to both foils so normally both foils are subjected to phosphate treatment. Normally, the aluminum foil of high purity is subjected to chemical or electrochemical etching to obtain the etching foil, however, as the electrode foil of the present invention, the etching foil obtained by performing the phosphate aqueous solution impregnation process before, during, or after the etching process is used as the cathode electrode foil. Further, as the anode electrode foil, the etching foil, the etching foil untreated with phosphate is subjected to phosphate synthesis, or the electrode foil that performed the phosphate impregnation process before, during, or after the chemical treatment is used.

Furthermore, the effect of the present invention improves by adding the phosphorous compounds to the electrolyte solution of the electrolytic capacitor described above. Examples of phosphorus compounds and salts thereof include orthophosphoric acid, phosphonous acid, hypophosphorus acid and their salts. As the salts of the phosphorus compounds, an ammonium salt, an aluminum salt, a sodium salt, a calcium salt, and a potassium salt can be used. Moreover, examples of phosphorous compound include ethyl phosphate, diethyl phosphate, butyl phosphate, dibutyl phosphate and the like; and phosphonate such as 1-hydroxyethylidene-1,1-diphosphonic acid, aminotrimethylene phosphonic acid, phenyl phosphonic acid, and the like. Moreover, examples of phosphinate include methyl phosphinate, butyl phosphinate, and the like.

Furthermore, examples of condensed phosphates include straight-chain condensed phosphates such as pyrophosphoric acid, tripolyphosphoric acid, tetrapolyphosphoric acid, and the like; cyclic condensed phosphates such as metaphosphate, hexametaphosphate, and the like, or the combination of the chain condensed phosphate and cyclic condensed phosphate. Further, as salts of these condensates, an ammonium salt, an aluminum salt, a sodium salt, a calcium salt, a potassium salt, and the like can be used.

The addition amount is ranging from 0.05 to 3% by weight, and preferably is ranging from 0.1 to 2% by weight.

The electrolytic capacitor of the present invention described above has a low impedance characteristic and a high withstand voltage of 100V class, and an excellent high temperature life characteristic. In other words, in case of performing the high temperature life test by using the aluminum tetrafluoride salt, the reactivity of the electrolyte solution with the electrode foil gets large due to the moisture inside the electrolyte solution, and the characteristics are affected. However, since the electrolytic capacitor of the present invention utilizes the electrode foil subjected to phosphate treatment, the reaction of the electrode foil with the electrolyte solution is controlled, whereby the high temperature life characteristic is stabilized.

(First Embodiment)

Subsequently, the first electrolytic capacitor of the present invention will be explained by using the embodiments. The electrolytic capacitor of the present invention has the same structure as that of the conventional ones. The present invention is explained by referring to FIGS. 1 and 2. A capacitor element 1 is formed by winding an anode electrode foil 2 and a cathode electrode foil 3 via a separator 11. As FIG. 2 shows, the anode electrode foil 2 and the cathode electrode foil 3 are connected respectively to a lead wire 4 for leading the anode electrode and an another lead wire 5 for leading the cathode electrode.

These lead wires 4 and 5 are composed of connecting members 7 being in contact with the electrode foils, rod members 6 having been molded integrally with the connecting members 7, and outer connecting members 8 having been fixed at the tip of the rod members 6. The connecting member 7 and the rod member 6 are made from aluminum of 99% purity while the outer connecting member 8 is made of a copper-plated steel wire (hereinafter CP wire). On the surfaces of the rod members 6 of the lead wires 4 and 5 at least, anode oxide films made of aluminum oxide are formed by a chemical treatment with ammonium phosphate aqueous solution. These lead wires 4 and 5 are connected respectively to the electrode foils 2 and 3 at the connecting members 7 by means of stitching, ultrasonic welding, and the like.

The anode electrode foil 2 is made of an aluminum foil of 99.9% purity in an acidic solution thereby enlarging the surface area thereof through the chemical or electrochemical etching process, and then subjecting the aluminum foil to a chemical treatment in an ammonium adipate aqueous solution, to thereby form an anode oxide film on the surface thereof.

The capacitor element 1, which impregnates the electrolyte solution, is then housed into a bottomed cylindrical outer case 10 made of aluminum. The outer case 10 is provided at the opening with a sealing member 9 and then sealed by drawing. The sealing member 9 is made of, for example, an elastic rubber such as butyl rubber, and the like, and has perforation holes through which the lead wires 4 and 5 are to be passed.

Then, the ceramics coating layer is formed on the surface of the rod member 6 of the aluminum conductor to be used as the cathode electrode leading means. This ceramics coating layer is formed by discharging a coating agent made of $Al_2O_3$, and $SiO_2$ metal alcoxide ceramics to the rod member 6, thermally treated for 10 seconds at 180° C., followed by another discharging of the coating agent and another thermal treatment for 10 seconds at 180° C., followed by another thermal treatment for 20 minutes at 180° C.

Moreover, the electrolyte solution A containing 75% by weight of γ-butyrolactone as solvent and 25% by weight of 1-ethyl-2,3-dimethylimidazolinium aluminum tetrafluoride salt as solute is used. The electrolyte solution B containing 80% by weight of γ-butyrolactone as solvent and 20% by weight of 1-ethyl-2,3-dimethylimidazolinium aluminum tetrafluoride salt as solute is used. Further, for comparison, electrolyte solution C containing 75% by weight of γ-butyrolactone as solvent and 1-ethyl-2,3-dimethylimidazolinium hydrogen phthalate salt as solute is used.

The rated voltages of the electrolytic capacitors using the electrolyte solutions A and C are 16V, and that of using the electrolyte solution B is 100V. The characteristics of the electrolytic capacitors are evaluated. The test condition is 125° C. at 2,000 hours in the loaded state, and 105° C. at 2,000 hours in the unloaded state. The results are shown in (Table 1-1) to (Table 1-4).

TABLE 1-1

| | Electrolyte | Coating layer | Initial Characteristic Cap (µF) | Tan δ | 125° C./ 2000 hrs loaded Δ cap (%) | Tan δ | Leakage |
|---|---|---|---|---|---|---|---|
| Embody 1 | A | Yes | 401 | 0.028 | −12.1 | 0.043 | 0/25 |
| Compare 1 | C | — | 406 | 0.047 | −10.1 | 0.141 | 6/25 |

TABLE 1-2

| | Electrolyte | Coating layer | Initial Characteristic Cap (µF) | Tan δ | 105° C./ 2000 hrs unloaded Δ cap (%) | Tan δ | Leakage |
|---|---|---|---|---|---|---|---|
| Embody 1 | A | Yes | 402 | 0.028 | −5.4 | 0.034 | 0/25 |
| Compare 1 | C | — | 407 | 0.045 | −4.3 | 0.051 | 7/25 |

TABLE 1-3

| | Electrolyte | Coating layer | Initial Characteristic Cap (µF) | Tan δ | 125° C./ 2000 hrs loaded Δ cap (%) | Tan δ | Leakage |
|---|---|---|---|---|---|---|---|
| Embody 2 | B | Yes | 22.8 | 0.011 | −6.5 | 0.025 | 0/25 |

TABLE 1-4

| | Electrolyte | Coating layer | Initial Characteristic Cap (µF) | Tan δ | 105° C./ 2000 hrs unloaded Δ cap (%) | Tan δ | Leakage |
|---|---|---|---|---|---|---|---|
| Embody 2 | B | Yes | 22.7 | 0.012 | −0.9 | 0.015 | 0/25 |

As (Table 1-1) and (Table 1-2) clearly show, the electrolytic capacitors of the embodiments have excellent high temperature life characteristics, a low dielectric loss coefficient (tan δ), and a less change in dielectric loss coefficient (tan δ) at 125° C., compared with the electrolytic capacitor of the comparative example, and is effective in preventing liquid leakage. Furthermore, (Table 1-3) and (Table 1-4) clearly show the excellent life characteristics and initial characteristics of the rated voltage 100V, to implement the 100V class electrolytic capacitor having a low impedance characteristic not found in the conventional ones.

(Second Embodiment)

Subsequently, the second electrolytic capacitor of the present invention will be explained referring to the embodiment. This electrolytic capacitor has the same structure as that of the first electrolytic capacitor, and the contents of characteristic evaluation and the electrolyte solution in use are also the same. In the present invention, the insulating synthetic resin layer is formed on the surface of the rod member 6 of the aluminum conductor to be used in the cathode loading means. The insulating synthetic resin layer is formed by mixing 97% by weight of epoxy resin 97 to 3% by weight of β-(3,4-epoxy cyclo hexyl)-ethylmethoxy-silane, which is coated to the rod member by discharging, followed by drying. The results are shown in (Table 2-1) and (Table 2-4).

TABLE 2-1

| | | | Initial Characteristic | | | 125° C./ 2000 hrs loaded | |
|---|---|---|---|---|---|---|---|
| | Electro-lyte | Coating layer | Cap (μF) | Tan δ | Δ cap (%) | Tan δ | Leakage |
| Embody 3 | A | Yes | 402 | 0.028 | −12.1 | 0.042 | 0/25 |
| Compare 2 | C | — | 406 | 0.048 | −10.2 | 0.141 | 6/25 |

TABLE 2-2

| | | | Initial Characteristic | | | 105° C./ 2000 hrs unloaded | |
|---|---|---|---|---|---|---|---|
| | Electro-lyte | Coating layer | Cap (μF) | Tan δ | Δ cap (%) | Tan δ | Leakage |
| Embody 3 | A | Yes | 402 | 0.027 | −5.4 | 0.033 | 0/25 |
| Compare 2 | C | — | 408 | 0.045 | −4.3 | 0.053 | 7/25 |

TABLE 2-3

| | | | Initial Characteristic | | | 125° C./ 2000 hrs loaded | |
|---|---|---|---|---|---|---|---|
| | Electro-lyte | Coating layer | Cap (μF) | Tan δ | Δ cap (%) | Tan δ | Leakage |
| Embody 4 | B | Yes | 22.9 | 0.011 | −6.5 | 0.024 | 0/25 |

TABLE 2-4

| | | | Initial Characteristic | | | 105° C./ 2000 hrs unloaded | |
|---|---|---|---|---|---|---|---|
| | Electro-lyte | Coating layer | Cap (μF) | Tan δ | Δ cap (%) | Tan δ | Leakage |
| Embody 4 | B | Yes | 22.8 | 0.012 | −0.8 | 0.015 | 0/25 |

As (Table 2-1) and (Table 2-2) clearly show, the electrolytic capacitor of this embodiment has excellent high temperature life characteristics, change in the dielectric loss coefficient (tan δ) of 125° C. is small, and the dielectric loss coefficient (tan δ) is small, compared with the electrolytic capacitor of the comparative example, and is effective in preventing the liquid leakage. Furthermore, (Table 2-3) and (Table 2-4) clearly show the excellent life characteristics and initial characteristics of the rated voltage 100V, to implement the 100V class electrolytic capacitor having the low impedance characteristic not found in the conventional ones.

(Third Embodiment)

Subsequently, the third electrolytic capacitor will be explained referring to the embodiment. The electrolytic capacitor of this embodiment has the same structure as that of the first electrolytic capacitor, except that in the present invention, a partial cross-linking peroxide butyl rubber that added peroxide as cross-linking agent to a butyl rubber polymer comprised of isobutylene, isoprene, and divinylbenzene copolymer is used as the sealing member. A quinoid vulcanized butyl rubber polymer comprised of isobutylene and isoprene copolymer is used as the butyl rubber in the comparative example.

Moreover, the electrolyte solution in use is same as the one used in the first electrolytic capacitor.

The rated voltages of the electrolytic capacitors using the electrolyte solutions A and C are 16V, and that of using the electrolyte solution B is 100V. The characteristics of the electrolytic capacitor were evaluated. The test conditions are 125° C. at 1000 hours in the loaded state and 105° C. at 1000 hours in the unloaded state. The results are shown in (Table 3-1) to (Table 3-4).

TABLE 3-1

| | | | Initial Characteristic | | | 125° C./ 1000 hrs loaded | |
|---|---|---|---|---|---|---|---|
| | Electro-lyte | Sealing member | Cap (μF) | Tan δ | Δ cap (%) | Tan δ | Leakage |
| Embody 3 | A | Peroxide | 400 | 0.028 | −7.6 | 0.034 | 0/25 |
| Compare 3 | A | Quinoid | 401 | 0.028 | −7.8 | 0.038 | 5/25 |
| Compare 4 | C | Peroxide | 405 | 0.047 | −6.1 | 0.060 | 0/25 |

TABLE 3-2

| | | | Initial Characteristic | | | 105° C./ 1000 hrs unloaded | |
|---|---|---|---|---|---|---|---|
| | Electro-lyte | Sealing member | Cap (μF) | Tan δ | Δ cap (%) | Tan δ | Leakage |
| Embody 5 | A | Peroxide | 400 | 0.028 | −6.0 | 0.032 | 0/25 |
| Compare 3 | A | Quinoid | 400 | 0.028 | −6.6 | 0.036 | 7/25 |
| Compare 4 | C | Peroxide | 400 | 0.028 | −4.2 | 0.048 | 0/25 |

TABLE 3-3

| | | | Initial Characteristic | | | 125° C./ 1000 hrs loaded | |
|---|---|---|---|---|---|---|---|
| | Electro-lyte | Sealing member | Cap (μF) | Tan δ | Δ cap (%) | Tan δ | Leakage |
| Embody 6 | B | Peroxide | 22.8 | 0.011 | −2.1 | 0.019 | 0/25 |

TABLE 3-4

| | | | Initial Characteristic | | | 105° C./ 1000 hrs unloaded | |
|---|---|---|---|---|---|---|---|
| | Electro-lyte | Sealing member | Cap (μF) | Tan δ | Δ cap (%) | Tan δ | Leakage |
| Embody 6 | B | Peroxide | 22.9 | 0.011 | −0.9 | 0.014 | 0/25 |

As (Table 3-1) clearly shows, the electrolytic capacitor of the embodiment has excellent in high temperature life characteristics, a low dielectric loss coefficient (tan δ), and a less change in dielectric loss coefficient (tan δ) at 125° C., compared with that of the conventional example. Also, as can be seen from (Table 3-3) and (Table 3-4), clearly show the excellent life characteristics and initial: characteristics of the rated voltage 100V, to implement the 100V class electrolytic capacitor having a low impedance characteristic not found in the conventional ones.

(Fourth Embodiment)

Subsequently, the large-sized, fourth electrolytic capacitor will be explained by using the embodiment. As embodiment 7 of the electrolytic capacitor structure, as shown in FIG. 3, a capacitor element 1 is formed by an anode electrode foil and a cathode electrode foil, wound together with intervening separator. Moreover, the anode and cathode electrode foils are respectively connected to the anode leading terminal 18 and the cathode leading terminal 19.

The anode electrode foil used is one obtained in such a manner that an aluminum foil of a purity of 99% is subjected to chemical or electrochemical etching in an acidic solution to enhance the surface area thereof and then subjected to chemical treatment in an ammonium borate or ammonium adipate aqueous solution, so as to form an anode oxide film layer on the surface thereof.

Moreover, the cathode electrode foil used is an aluminum foil of a purity of 99% having been subjected to etching by using the chemical treatment of 1V.

The aluminum foil of 99% purity and more is used as the anode leading terminal 18 and the cathode leading terminal 19.

Then, the rivets 14 and 15 made of aluminum including the rod members 16 and the head members 17 are formed.

Then, on the surface of the rod member 16 of the rivet 15 of the cathode electrode side, a ceramics coating layer is formed as embodiment 3.

Subsequently, the rivets 14 and 15 are buried near the central area of the sealing component 13 that is formed by joining the elastic material, such as rubber board, and the hard insulating board, such as phenol resin laminated board. Then, the outside terminals 20 are prepared on the head members 17 of the rivets 14 and 15, the end parts of the rivets 14 and 15 are sealed by drawing, and the outside terminals 20 are fixed into position.

Further, as the embodiment 8, the surface of the cathode leading terminal 19 may be similarly coated replacing the rod member 16 of the cathode electrode side rivet 15.

The electrolyte solution and the ceramics coating layer in use are the same as the first electrolytic capacitor.

The electrode leading terminal of the capacitor element 1 impregnated with the electrolyte solution as per above is connected to lower ends of the rivets 14 and 15. The capacitor element 1 is housed into a cylindrical outer case 10 with a bottom, made from aluminum.

Then, the sealing component 13 is inserted to the open end of the outer case 10. Further, the end part of the outer case 10 of the electrolytic capacitor is sealed by drawing and bending.

The electrolytic capacitor configured as above is compared with the electrolytic capacitor that did not form the ceramics coating layer on the rivet as comparative example 5. The conditions are 105° C. at 2000 hours at 16V load, followed by checking of electrolyte: solution leakage. The results are shown in (Table 4-1). Moreover, after leaving it for 2000 hours at 105° C., the electrolyte solution leakage is checked in the likewise manner. The results are shown in (Table 4-2).

TABLE 4-1

| | Electrolyte | Coating layer | Leakage |
|---|---|---|---|
| Embody 7 | A | Cathode electrode rivet | 0/25 |
| Embody 8 | A | Cathode lead terminal | 0/25 |
| Compare 5 | C | — | 5/25 |

TABLE 4-2

| | Electrolyte | Coating layer | Leakage |
|---|---|---|---|
| Embody 7 | A | Cathode electrode rivet | 0/25 |
| Embody 8 | A | Cathode lead terminal | 0/25 |
| Compare 5 | C | — | 5/25 |

As (Table 4-1) and (Table 4-2) clearly show, the leakage did not occur in the present invention both in the loaded and unloaded states.

(Fifth Embodiment)

Subsequently, the large-sized, fifth electrolytic capacitor shall be explained by using the embodiments. Structure of this electrolytic capacitor is similar to the fourth electrolytic capacitor, however, in the present invention, the insulating synthetic resin layer is formed on the surface of the rod member 16 of the rivet 15 of the cathode electrode side, as embodiment 9.

Moreover, replacing the rod member 16 of the rivet 15, the insulating synthetic resin layer is formed on the surface of the cathode leading terminal 19, as embodiment 10. As comparative example 6, the electrolytic capacitor structured in the likewise manner as embodiments 9 and 10, except for not forming the insulating synthetic resin layer on the rivet, is compared.

Further, the insulating synthetic resin layer and the electrolytic solution in use are similar to the second electrolytic capacitor. The characteristic evaluation contents are the same as the fourth electrolytic capacitor. These results are shown in (Table 5-1) and (Table 5-2).

TABLE 5-1

| | Electrolyte | Coating layer | Leakage |
|---|---|---|---|
| Embody 9 | A | Cathode electrode rivet | 0/25 |
| Embody 10 | A | Cathode lead terminal | 0/25 |
| Compare 6 | C | — | 5/25 |

TABLE 5-2

| | Electrolyte | Coating layer | Leakage |
|---|---|---|---|
| Embody 9 | A | Cathode electrode rivet | 0/25 |
| Embody 10 | A | Cathode lead terminal | 0/25 |
| Compare 6 | C | — | 5/25 |

As (Table 5-1) and (Table 5-2) clearly show, the leakage did not occur in the present invention both in the loaded and unloaded states.

Further, according to the first and fifth electrolytic capacitors described as per above, in case of using the electrode foils subjected to phosphate treatment as the cathode electrode foil or the anode electrode foil, the high temperature life characteristic improved: further, in addition to the improvement of high temperature life characteristic if the phosphate compound is added to the electrolyte solution.

INDUSTRIAL APPLICABILITY

According to first and second electrolytic capacitor of the present invention, the electrolyte solution containing the aluminum tetrafluoride salt is used, and a ceramics coating layer is formed at a contact portion with the sealing component of the rivet or the cathode leading means, such that the electrolytic capacitor having a low impedance characteristic and high withstand voltage characteristic, and excellent high temperature life characteristic and leakage characteristic are provided.

According to the third electrolytic capacitor of the present invention, in case of using, as the sealing member, a partial cross-linking peroxide butyl rubber that added peroxide as cross-linking agent to a butyl rubber polymer comprised of isobutylene, isoprene, and divinylbenzene copolymer. Namely, the electrolytic capacitor having low impedance characteristic and high voltage characteristic and the of excellent high temperature life characteristic is supplied. The present invention achieves an extremely remarkable effect of preventing the liquid leakage. According to fourth and fifth electrolytic capacitor of the present invention, the electrolyte solution containing the aluminum tetrafluoride salt is used, and an insulating synthetic resin layer is formed at a contact portion with the sealing component of the rivet or the cathode leading means, such that the electrolytic capacitor having a low impedance characteristic and high withstand voltage characteristic, and excellent high temperature life characteristic and leakage characteristic is provided.

The invention claimed is:

1. An electrolytic capacitor having a capacitor element fabricated by winding an anode electrode foil provided with anode leading means and a cathode electrode foil provided with cathode leading means via a separator and impregnating it with an electrolyte solution, an outer case for housing the capacitor element, and a sealing member for sealing an open part of the outer case, wherein the electrolyte solution comprises an aluminum tetrafluoride salt, and a ceramics coating layer is formed at a contact portion with the sealing member and the cathode leading means.

2. An electrolytic capacitor according to claim 1, wherein the cathode leading means includes an aluminum conductor comprised of a rod member and a flat member, wherein the ceramics coating layer is formed on the rod member prior to capacitor production process.

3. An electrolytic capacitor according to claim 2, wherein at least one of the cathode or anode foils is subjected to a phosphate treatment.

4. An electrolytic capacitor according to claim 1, wherein the ceramics coating layer is formed by using a coating agent comprised of one or more metal alcoxide ceramics wherein the metal alcoxide is selected from the group consisting of $Al_2O_3$, $SiO_2$, and $ZrO_2$ and combinations thereof.

5. An electrolytic capacitor according to claim 4, wherein at least one of the cathode or anode foils is subjected to a phosphate treatment.

6. An electrolytic capacitor according to claim 1, wherein at least one of the cathode or anode foils is subjected to a phosphate treatment.

7. An electrolytic capacitor obtained by impregnating a capacitor element with an electrolyte solution containing an aluminum tetrafluoride salt, wherein the capacitor element is formed by winding an anode electrode foil with an anode leading terminal and a cathode electrode foil with a cathode leading terminal together with an intervening separator, housing the capacitor element in an cylindrical outer case with a bottom, and sealing an open end of the case by a sealing member with a rivet connecting said cathode leading terminal to said outside terminal, wherein a ceramics coating layer is formed at a contact portion of the rivet with the sealing component.

8. An electrolytic capacitor according to claim 7, wherein at least one of the cathode or anode foils is subjected to a phosphate treatment.

9. An electrolytic capacitor obtained by impregnating a capacitor element with an electrolyte solution containing an aluminum tetrafluoride salt, wherein the capacitor element is formed by winding an anode electrode foil with an anode leading terminal and a cathode electrode foil with a cathode leading terminal together with an intervening separator, housing the capacitor element in an cylindrical outer case with a bottom, and sealing an open end of the case by a sealing member with a rivet connecting said cathode leading terminal to said outside terminal wherein a ceramics coating layer is formed on said cathode leading terminal.

10. An electrolytic capacitor according to claim 9, wherein at least one of the cathode or anode foils is subjected to a phosphate treatment.

* * * * *